United States Patent
Chevallier et al.

(10) Patent No.: US 11,814,579 B2
(45) Date of Patent: Nov. 14, 2023

(54) FOAMING COMPOSITIONS FOR ENHANCED OIL RECOVERY

(71) Applicants: ENERGY SOLUTIONS (US) LLC, Princeton, NJ (US); IFP Energies Nouvelles, Rueil-Malmaison (FR)

(72) Inventors: Eloise Chevallier, Bordeaux (FR); Mikel Morvan, Pessac (FR); Vincent Miralles, Bordeaux (FR)

(73) Assignees: ENERGY SOLUTIONS (US) LLC, Princeton, NJ (US); IFP Energies Nouvelles, Rueil-Malmaison (FR)

( * ) Notice: Subject to any disclaimer, the term of this patent is extended or adjusted under 35 U.S.C. 154(b) by 1 day.

(21) Appl. No.: 17/433,163

(22) PCT Filed: Feb. 14, 2020

(86) PCT No.: PCT/EP2020/053940
§ 371 (c)(1),
(2) Date: Aug. 23, 2021

(87) PCT Pub. No.: WO2020/169478
PCT Pub. Date: Aug. 27, 2020

(65) Prior Publication Data
US 2022/0145167 A1    May 12, 2022

(30) Foreign Application Priority Data
Feb. 22, 2019   (EP) .................................... 19158711

(51) Int. Cl.
| | |
|---|---|
| E21B 43/16 | (2006.01) |
| C09K 8/594 | (2006.01) |
| C09K 8/584 | (2006.01) |
| C09K 8/588 | (2006.01) |

(52) U.S. Cl.
CPC .............. *C09K 8/594* (2013.01); *C09K 8/584* (2013.01); *C09K 8/588* (2013.01); *E21B 43/166* (2013.01)

(58) Field of Classification Search
CPC ........ C09K 8/594; C09K 8/584; C09K 8/588; E21B 43/166
See application file for complete search history.

(56) References Cited

U.S. PATENT DOCUMENTS

| | | | |
|---|---|---|---|
| 5,129,457 A | 7/1992 | Sydansk | |
| 5,780,395 A | 7/1998 | Sydansk | |
| 9,068,108 B2 * | 6/2015 | Hill | .......................... C09K 8/86 |
| 9,080,440 B2 * | 7/2015 | Panga | ................... E21B 43/164 |
| 9,133,387 B2 * | 9/2015 | Loiseau | ................... C09K 8/80 |
| 2012/0285694 A1 * | 11/2012 | Morvan | ................. C09K 8/594 |
| | | | 166/309 |
| 2014/0174735 A1 | 6/2014 | Southwick et al. | |
| 2015/0291875 A1 * | 10/2015 | Morvan | ................. C09K 8/584 |
| | | | 166/305.1 |
| 2017/0292355 A1 | 10/2017 | Van Batenburg et al. | |

FOREIGN PATENT DOCUMENTS

| | | |
|---|---|---|
| FR | 2920818 A1 | 3/2009 |
| WO | 2015173052 A1 | 11/2015 |
| WO | 2016079121 A1 | 5/2016 |

OTHER PUBLICATIONS

International Search Report issued in corresponding International Application No. PCT/EP2020/053940; dated Apr. 1, 2020 (3 pages).
Written Opinion of the International Searching Authority issued in corresponding International Application No. PCT/EP2020/053940; dated Apr. 1, 2020 (7 pages).
Office Action issued in counterpart Russian Application No. 2021127508, dated Jun. 27, 2023, with English translation (4 pages).

* cited by examiner

*Primary Examiner* — Silvana C Runyan
(74) *Attorney, Agent, or Firm* — Osha Bergman Watanabe & Burton LLP

(57) ABSTRACT

The invention relates to a composition C which comprises, in an aqueous medium M:
  surfactants suitable for creating a foam in the presence of a gas; and
  polymers P based on acrylamide or acrylamido units, having a molecular mass of 1,000,000 to 20,000,000 g/mol;
or: composition C has a viscosity of less than 6 mPa·s; and
  the content of polymer P is greater than the concentration limit beyond which the apparent viscosity of a foam obtained from composition C is greater by at least 10% than the apparent viscosity of a foam obtained from the same composition but deprived of polymers.
The invention further relates to the use of these compositions as foaming compositions for EOR.

15 Claims, No Drawings

FOAMING COMPOSITIONS FOR ENHANCED OIL RECOVERY

CROSS-REFERENCE TO RELATED APPLICATION

The present application is a national stage of PCT Application No. PCT/EP2020/053940 filed on Feb. 14, 2020, which is herein incorporated by reference.

TECHNICAL FIELD

This invention relates to the assisted recovery of crude oil from underground formations, and more particularly to assisted oil recovery techniques using foaming compositions or foams.

BACKGROUND

During the extraction of oil from a hydrocarbon reservoir (oil reservoir such as a rock formation, whether or not consolidated, or sand, for example), according to a first step called "primary recovery", the oil is drawn out of a production well by the naturally occurring overpressure within the reservoir. However, this primary recovery only allows access to a small amount of the oil contained in the reservoir, typically on the order of 10 to 15% at most.

Secondary production methods are employed to allow the continued oil extraction following this primary recovery when the reservoir pressure becomes insufficient to displace the oil still in place. Typically, a fluid is injected (re-injection of the water produced, diluted or not, injection of sea or river water, or even an injection of gas, for example) into the hydrocarbon reservoir, with a view to employing an overpressure within the reservoir suitable for driving the oil towards the production well(s). A common technique in this context is the injection of water (also referred to as flooding or "waterflooding") or gas injection ("gasflooding"), in which large volumes of water or gas, respectively, are injected under pressure into the reservoir via injection wells. This injection induces driving part of the oil encountered by the water or gas towards one or more producing well(s). However, secondary production methods such as the injection of water or gas mentioned above, only make it possible to extract a relatively small part of the hydrocarbons in place (typically on the order of 30%). This partial sweeping is due in particular to the oil being trapped by capillary forces, to the differences in viscosity and density existing between the injected fluid and the hydrocarbons in place, as well as to heterogeneities at micro- or macroscopic scale (pore scale and also reservoir scale).

Various techniques called "assisted oil recovery" (or assisted (or enhanced) recovery of hydrocarbons RAH) have been proposed to attempt to recover the rest of the oil, which remains in the underground formations after implementing primary and secondary production methods, which is more commonly referred to by the term "EOR" (for "Enhanced Oil Recovery").

Among the EOR techniques, there are those that use compositions capable of creating foams. These techniques may use preformed foams, or alternatively foaming compositions capable of creating an in-situ foam in the subterranean formation where they are injected, in the presence of a gas (co- or post-injected or else present in the subterranean formation).

The use of foams or EOR foaming compositions most often targets maximizing the subterranean formation sweeping, particularly to access less accessible zones that would be poorly swept by non-foaming compositions, if at all. In particular, techniques using foams are well suited to naturally fractured reservoirs (typically reservoirs based on carbonates). Although conventional reservoirs may show some fractures, naturally fractured reservoirs are distinguished from conventional reservoirs by the density and dimensions of the fractures that form an actual network, which induces a particularly complicated problem of oil recovery.

The techniques using foams are also well-suited to reservoirs exhibiting so-called gas mobility control problems including in particular the existence of a preferential path; and/or theft zone; and/or "gravity override" type phenomena (multiphase flow due to differences in density); and/or heterogeneity of permeability. For more details on this subject, we may refer to the review "Mobility and conformance control for carbon dioxide Enhanced Oil Recovery (CO2-EOR) via Thickeners, Foams, and Gels—A detailed literature review of 40 years of research"; DOE/NETL-2012/1540, Activity 4003.200.01; Enick R; Olsen, D; December 2011

In techniques using foams, a general increase in the pressure generated by the foam upon the rock and within the rock fractures is sought especially in the case of naturally fractured reservoirs, where the kinetics of oil recovery are directly linked to the pressure generated within the fracture.

The performance of a foam in the porous medium where it is injected may be evaluated by the pressure generated at a given flow rate in a given porous medium, (especially in a fracture) or by the apparent viscosity of the foam, which is directly correlated with the pressure difference between the inlet and the outlet of the porous medium where the foam is injected.

SUMMARY

One of the purposes of this invention is to provide a means of increasing, at acceptable costs, the performance of a foaming composition used in EOR, by increasing the apparent viscosity of a foam created from this composition in a subterranean formation.

To this end, this invention proposes the addition of a small amount of specific polymers to the foaming compositions used in EOR. The inventors have now unexpectedly established that these polymers make it possible to increase the apparent viscosity of the foam, even at very low levels which do not induce a significant increase in the viscosity of the foaming composition used to create the foam.

It has now been established, with the useful polymers according to the invention, that there is a concentration limit, which is very low, beyond which an increase is obtained in the apparent viscosity of the foam (and therefore in the effectiveness of this foam in EOR) created in the presence of these polymers. Therefore, according to the invention, the polymer is used at levels greater than this concentration limit from which the polymer is found to be effective, but remains at low concentrations so as not to induce a significant increase in the viscosity of the foaming composition.

More precisely, according to a first aspect, this invention relates to a composition C suitable as a foaming composition for the EOR, which comprises, in an aqueous medium M:
   a surfactant or a mixture of surfactants capable of creating a foam in the presence of a gas; and a polymer P based on acrylamide or acrylamido units, having an average molecular mass $M_w$ ranging from 1,000,000 to 20,000,000 g/mol; or a mixture of such polymers P or:

composition C has a viscosity, as measured at 25° C. under a shear rate of 10 s$^{-1}$, which is less than 6 mPa·s (i.e., 6 cp);

and by designating C' as the composition identical to composition C with the sole exception that it does not contain polymer P; and by C" as the composition identical to composition C with the sole exception that it does not contain polymers P nor a surfactant specific to the formation of a foam:

(i) the content of polymer P in composition C is greater than the concentration limit beyond which the apparent viscosity of a foam obtained from composition C becomes greater by at least 10% than the apparent viscosity of a foam obtained from composition C' at least under certain conditions; and (ii) preferably, composition C' exhibits a viscosity as measured at 25° C. under a shear rate of 10 s$^{-1}$ less than four times the viscosity of composition C".

Thus, according to the invention, polymer P is used at a content greater than that where it has a notable effect on the increase in the apparent viscosity of the foams created from composition C, but also maintains a polymer P content and a surfactant content that is sufficiently low for composition C to exhibit low viscosity.

DETAILED DESCRIPTION

Composition C', to which reference is made above, is a composition serving as a point of comparison, equal in all respects to composition C but deprived only of polymers P. It therefore contains in particular the surfactants present in composition C, as well as the aqueous medium M and any other compounds possibly present in composition C.

Composition C", which also serves as a point of comparison, corresponds to composition C, deprived of only polymers P and surfactants suitable for creating a foam. In other words, it corresponds to composition C' deprived solely of surfactants suitable for creating a foam.

The apparent viscosity of a foam obtained from a composition C according to the invention (apparent viscosity denoted $\eta_c$ in this paragraph for the sake of brevity) is greater than the apparent viscosity of a foam obtained from composition C' as defined above (viscosity noted $\eta_{c'}$ in this paragraph). The content of polymer P is such that there are at least certain conditions where the apparent viscosity of a foam obtained from composition C is at least 10% greater than the viscosity of a foam obtained from composition C', namely that the $(\eta_c-\eta_{c'})/\eta_{c'}$ ratio is greater than or equal to 10%. Furthermore, according to a particular embodiment, compositions C are employed where the content of polymer P is such that there are at least certain conditions where the apparent viscosity of a foam obtained from composition C becomes greater by at least 15%, or even at least 20% to the apparent viscosity of a foam obtained from composition C'. In other words, according to these embodiments $(\eta_c-\eta_{c'})/\eta_{c'}$ is greater than or equal to 15%, or even 20%.

According to an interesting embodiment, a composition according to the invention is a composition in which the content of polymer P is such that this condition on the apparent viscosities is confirmed in particular under the conditions of a specific test. More precisely, a composition according to the invention is typically a composition in which the content of polymer P is such that the apparent viscosity of a foam created by composition C and measured under the conditions of a sandpack test:

carried out by co-injecting the composition to be tested with dinitrogen and with a gas fraction of 0.9 using Ottawa sand with a permeability greater than 1 darcy, with a back pressure of 50 bars at a temperature of 25° C. and at an interstitial speed of 100 ft/d is at least 10%, preferably at least 15%, or even at least 20%, higher than the apparent viscosity of a foam obtained from composition C' under the same conditions.

The so-called "sandpack" test to which reference is made above is a test well known to those skilled in the art and which consists of measuring the ΔP pressure difference at the terminals of a medium porous model (sandpack).

The apparent viscosity ($\eta_{app}$) (is calculated from the ΔP pressure difference by the following formula:

$$\eta_{app} = \frac{k.\Delta P}{L.v_i\Phi}$$

or: k is the permeability of the sandpack

L is the length of the sandpack $v_i$ is the interstitial speed

Φ is the sandpack porosity

For a given polymer or mixture of polymer P, a person skilled in the art may easily determine the amount of polymer P to use by first performing the sandpack test under the aforementioned specific conditions on a composition without polymer (corresponding to composition C') then by adding polymers P and by reproducing the test under the same conditions, and if necessary by increasing the quantity of polymer if too small an increase in the apparent viscosity is obtained.

According to another aspect, this invention relates to a method for assisted oil recovery from a subterranean formation, comprising the following steps:

a composition C of the aforementioned type is injected into said underground formation, through at least one injection well, said composition being in the presence of a gas (water vapor for example, dinitrogen, $CO_2$ or a hydrocarbon gas, for example) within the underground formation; then through at least one production well, recovering a fluid conveying the oil leaving the underground formation.

In the context of this method, the joint presence of composition C and a gas (water vapor, dinitrogen, $CO_2$ or hydrocarbon gas, in particular) in the underground formation, capable of creating a foam, may be obtained according to different embodiments, which include, in particular:

the prior creation of a foam by expanding composition C with a gas and the injection of this foam into the subterranean formation; or the joint injection of composition C, in a non-foamed form, and gas into the subterranean formation; or the injection of composition C into the subterranean formation, followed by the injection of a gas which will then be brought into contact with composition C within the subterranean formation; or the injection of composition C into a subterranean formation previously containing a gas (for example, naturally present in the formation and/or injected beforehand into the formation).

According to a particular embodiment, the method comprises:
- the joint injection of composition C, in non-foamed form, and gas into the subterranean formation; and or
- the injection of Composition C into the subterranean formation, followed by injecting a gas which will then be placed in contact with Composition C within the subterranean formation.

According to another embodiment, suitable in particular for an underground formation with a network of dense fractures, the method comprises:
- the prior formation of a foam by expanding composition C with a gas and injecting this foam into the subterranean formation; and/or
- the joint injection of composition C, in non-foamed form and gas into the subterranean formation.

Composition C used in the method of the invention is preferably a composition such that the apparent viscosity of a foam obtained from said composition C is greater by at least 10%, more preferably by at least 15%, or even at least 20% to the apparent viscosity of a foam obtained from composition C' as defined above (namely the composition corresponding to composition C deprived of polymer P) when these apparent viscosities are measured at the temperature of the subterranean formation and under the conditions of the subterranean formation.

Thus, typically, according to the invention, when composition C is used by injecting it into the subterranean formation with a gas, with a gas fraction of 0.9, it induces apparent viscosity greater than at least 10%, more preferably at least 15%, or even at least 20%, to the apparent viscosity induced under the same conditions by composition C'.

It is also preferred that, under the conditions to implement the method of the invention, using composition C induces an apparent viscosity greater than at least 10%, more preferably by at least 15%, or even at least 20% to the apparent viscosity which would be induced under the same conditions by composition C'.

The results obtained according to the invention are quite unexpected. Admittedly, it was known that the addition of a polymer could make it possible to improve the performance of an EOR foaming composition. However, in this context, adding polymers capable of drastically increasing the viscosity of the foaming composition has been recommended in the past insofar as it was expected that such an increase in viscosity would de facto induce an increase in the apparent viscosity of the foam, therefore in the pressure generated within a porous medium and, consequently, in the efficiency of extraction. However, against all expectations, the inventors have now demonstrated in the context of this invention that the foam created by foaming compositions containing polymers P induces a satisfactory increase in the pressure generated in a porous medium such as a rock or oil formation, even when they are used at concentrations which do not induce a significant increase in the viscosity of composition C.

This possibility is in particular very interesting insofar as the foaming compositions C used according to the invention are very fluid, and therefore very easy to handle, transport and dose. Another advantage—and by no means the least—is that compositions C are more easily injectable into a subterranean formation than more viscous compositions, in particular in the embodiments where the composition is injected in a non-foamed form (i.e., not in the form of a preformed foam, but in a liquid form, with a view to creating an in-situ foam within the subterranean formation).

In addition, polymers P have another advantage, namely that they tend most often to promote the durability of the foam obtained from composition C. Obtaining a durable foam is often key in EOR techniques that use a foam, because the foam created is not regenerated within subterranean formations.

Furthermore, the presence of polymers P advantageously tends to slow down the drying out of the foam (in particular, its liquid fraction drainage tends to slow down due to the presence of the polymers).

In addition, the presence of the polymer generally induces an increase in the contact time between the foam and the porous medium in which it is created, which, again, constitutes an advantage specific to inducing an improvement in the extraction processes using the compositions according to the invention.

Different possible embodiments of the invention will now be described in more detail. Polymers P According to the invention, a composition C comprises at least one polymer P based on acrylamide or acrylamido units and having an average molecular mass Mw ranging from 1,000,000 to 20,000,000 g/mol. Optionally, a mixture of several polymers of different natures may be used according to the invention.

The polymers P preferred according to the invention are the following polymers:
- polyacrylamides, preferably partially hydrolyzed, known as HPAM, and more generally copolymers comprising (and typically consisting of acrylamide units and acrylic acid units (whether or not resulting from acrylamide hydrolysis);
- polymers of 2-Acrylamido-2-MethylPropane Sulfonic acid (AMPS)
- copolymers comprising (and typically consisting of) acrylamide monomer units and AMPS monomer units
- polymers comprising acrylamide monomer units, AMPS monomer units and N-vinylpyrrolidone NVP units (and typically terpolymers consisting only of such monomer units); and
- mixtures of these polymers.

Polymers that are well suited according to the invention are particularly those which form the subject of the illustrative examples given at the end of this description.

Whatever the exact nature of polymers P used in composition C, it is generally preferred that the total concentration of polymers based on acrylamide or acrylamido units in composition C be less than or equal to 2% by mass relative to the total mass of the composition. Typically, the total concentration of polymers based on acrylamide or acrylamido units in composition C is less than 1.5 g/L. One of the advantages of the invention is that it makes it possible to use polymers at very low concentrations, for example, less than or equal to 1% by mass, in particular less than or equal to 0.5% by mass. Typically, the majority of polymers may be used at concentrations less than or equal to 0.1%.

Thus, the total concentration of polymers based on acrylamide or acrylamido units in composition C may typically be between 0.001 and 2% by mass, in particular between 0.002 and 1% by mass.

Surfactants

Any surfactant or surfactant system suitable for creating a foam may be used according to the invention.

Typically, the content of surfactants within composition C is between 0.05% and 2% by mass relative to the total mass of composition C, for example, between 0.1 and 1% by mass relative to the composition's total mass.

By way of example of the surfactants that may be used in a composition C according to the invention, specific mention may be made of the anionic surfactants below and the mixtures of surfactants comprising such surfactants:

sulfonate-type anionic surfactants,
and especially:
- internal olefin sulfonates, preferably of the internal olefin sulfonates in C15 to C28, for example in C20-24
- alkylaryl sulfonates, and in particular alkylbenzene sulfonate (ABS), where the alkyl group preferably contains at least 15 carbon atoms, for example between 15 and 24 carbon atoms, such as for example an alkylaryl sulfonate with an alkyl in C15-18
- sulfonates and/or disulfonates of alpha sulfocarbonyl compounds as described in particular in WO 2016/177817, such as for example, sulfonates and disulfonates derived from internal ketones in C15-C35
- sulfosuccinates and sulfosuccinamates anionic surfactants of the alkyl ether sulfate type (also called AES, or alkoxylated alkyl sulfates), where the alkyl group preferably contains at least 10 carbon atoms, for example between 10 and 16 carbon atoms, preferably propoxylated alkyl ether sulfates and/or ethoxylates containing up to 40 ethoxy groups and/or up to 20 propoxy groups, for example, comprising from 0 to 10 ethoxy groups and 0 to 10 propoxy groups (with at least one ethoxy or propoxy group present), such as for example an alkyl ether sulfate with an alkyl group comprising 7 propoxylated groups in C12-13.

anionic surfactants of alkyl glyceryl ether sulfonate (AGES) type, where the alkyl group preferably contains at least 10 carbon atoms, for example between 10 and 16 carbon atoms, these AGES preferably being propoxylated and/or ethoxylated, and containing by example between 0 and 20 ethoxy groups and between 0 and 10 propoxy groups (with at least one ethoxy or propoxy group present).

anionic surfactants of the alkyl ether carboxylate type
mixtures of these anionic surfactants.

According to an advantageous embodiment, one may for example use a mixture of surfactants according to the invention comprising:
- at least one first anionic surfactant of the sulfonate type, preferably of the type mentioned above; and
- at least one second anionic surfactant chosen from alkylether sulfates (AES); alkylglyceryl ether sulfonates (AGES); alkylether carboxylates; and mixtures thereof, this second surfactant preferably being chosen from the aforementioned preferential surfactants.

Alternatively, it is possible to use cationic surfactants in composition C, typically surfactants carrying hydrocarbon chains comprising 8 to 18 carbon atoms and a cationic group typically of the ammonium type.

Furthermore, a composition C according to the invention advantageously comprises surfactants of amphoteric or zwitterionic type, preferably as a mixture with at least one anionic surfactant (or alternatively at least one cationic surfactant).

Thus, according to one possible embodiment, the surfactant or mixture of surfactants present in composition C comprises at least one surfactant chosen from alkylamidobetaines, alkylamidohydroxysultaine, alkylbetaines, and alkylhydroxysultaines (in all these surfactants the alkyl chain comprises advantageously from 8 to 18 carbon atoms), or mixtures of these compounds. By way of example, mention may be made of cocoamidohydroxypropyl sultaine. Other possible compounds are the aminosulfonates which are the subject-matter of application WO 2015/173052.

For example, a composition C according to the invention may comprise a mixture of surfactant containing at least one anionic surfactant, preferably of the aforementioned type, and in particular of sulfonate type and
- at least one surfactant of the zwitterionic or amphoteric type, preferably of betaine or sultaine type, preferably of the aforementioned type; and or
- at least one nonionic surfactant, preferably ethoxylated alcohol type, for example, at least one ethoxylated alcohol with lengths of alkyl chains comprising 8 to 18 carbon atoms (typically at least 12) and from 2 to 25 ethoxyl groups (EO).

According to one particular embodiment, composition C comprises at least one anionic surfactant of the sulfonate type, preferably of the aforementioned type, and at least one surfactant of the betaine or sultaine type, preferably of the aforementioned type.

In this context, according to a particular variant, composition C comprises at least one anionic surfactant of sulfonate type, preferably of the aforementioned type; at least one surfactant of betaine or sultaine type, preferably of the aforementioned type; and at least one nonionic surfactant, preferably at least one ethoxylated alcohol of the aforementioned type.

Other Possible Compounds

According to the invention, composition C may advantageously comprise a certain number of additives in addition to the polymers and surfactants mentioned above.

Thus, it is particularly advantageous that the aqueous milieu M of composition C according to the invention comprises dissolved salts (in this case composition C" is typically a brine).

Preferably, the aqueous medium M has a salinity similar to that of the subterranean formation where composition C is intended to be injected, which tends to improve the oil recovery efficiency.

Typically, the total salt content in composition C according to the invention, is advantageously in the range between 1 to 260 g/L, preferably from 5 to 200 g/L. This is because a composition according to the invention generally comprises several distinct types of salts and the concentration of salts to which reference is made corresponds to the total amount of all the salts present.

As salts advantageously present in the composition of the invention, mention may be made, without limitation, of the halides of alkali metals and alkaline earth metals, such as NaCl, KCl, MgCl2, CaCl$_2$) or CaSO$_4$, or even iron II salts such as FeSO$_4$ or FeCl$_2$ Use of the compositions according to the invention According to the invention, compositions C are particularly well suited for creating foams with a gas fraction (fg)

greater than or equal to 0.7, greater than or equal to 0.8, for example, greater than 1. This gas fraction corresponds to the volume of gas related to the sum of the volumes of liquid and gas within the foam (and, in practice, it is calculated through the ratio of the volume flow rate of gas related to the sum of the volume flow rates of liquid and gas within the foam).

Thus, a composition C may typically be used by co-injecting it with a gas, with a ratio of the gas injection volume flow rate relative to the volume flow rate of the injection of composition C greater than the values mentioned above. Knowing that a foam tends to dry out by drainage within the formation, it is however possible to use lower injection rate ratios (the fg increases over time: following drainage, the foam tends to contain less and less liquid).

Furthermore, the methods of assisted oil recovery that use compositions C according to the invention are very particularly well suited for
- underground formations which are naturally fractured reservoirs (typically carbonate-based reservoirs); and/or
- reservoirs presenting gas mobility control problems, including the existence of a preferential path; and/or theft zone; and/or "gravity override" type phenomena; and/or heterogeneity of permeability.

The examples given below illustrate non-limiting embodiments of the invention and some of their advantages.

EXAMPLES

The following surfactants were added to a 5 g/L solution of NaCl (initial brine) at the amounts indicated below:
2.5 g/L of Rhodacal® A246-L (anionic surfactant of the sulfonate type)
2.5 g/L of Mackam CBS (alkylhydroxysultaine)
whereby a basic foaming composition was obtained (Control).

From this basic foaming composition, compositions C1 to C7 were prepared, by adding to said basic foaming composition a useful polymer according to the invention (Flopaam FP 3130S or Flopaam AN100 SH as the case may be), in the variable amounts shown in the table below (the contents are expressed in ppm and correspond to contents by mass relative to the total mass of the composition considered).

TABLE 1

| Compositions used in the examples | | | | | | | | | |
|---|---|---|---|---|---|---|---|---|---|
| | Brine | Control | C1 | C2 | C3 | C4 | C5 | C6 | C7 |
| NaCl (g/L) | | | | | 5 | | | | |
| A246-L (g/L) | 0 | | | | 2.5 | | | | |
| CBS (g/L) | 0 | | | | 2.5 | | | | |
| FP 3130S (ppm) | 0 | 0 | 25 | 50 | 100 | 500 | 1000 | — | — |
| AN100 SH (ppm) | 0 | 0 | — | — | — | — | — | 100 | 500 |
| Viscosity (mPa · s) | 1.01 | 1.07 | 1.08 | 1.21 | 1.37 | 2.64 | 5.61 | 1.22 | 2.36 |

The viscosities indicated in Table 1 correspond to the intrinsic viscosity of the liquid composition considered, in the non-foamed state, measured at 25° C. under a stress of 10 s$^{-1}$.

The control and the compositions C1 to C7 were used separately to generate a foam in a horizontal sandpack (300-400 μm glass) with a permeability equal to 10 darcy, under the same conditions, namely by co-injecting the composition tested with dinitrogen under an injection pressure of 50 bars (5·10$^6$ Pa). The tests were carried out with different gas fractions (fg), corresponding to the ratio of the dinitrogen volume flow rate compared to the sum of the volume flow rate of the composition and the gas volume flow rate during the injection.

For each test, the pressure difference across the sandpack was measured, and the apparent viscosity of the foam created from each composition was calculated from this pressure difference. The apparent viscosity values obtained in each case are reported in the table below.

TABLE 2

Apparent Viscosity (in mPa · s) of the Foam Created for Different Values of fg

| | fg | | | | |
|---|---|---|---|---|---|
| | 0.8 | 0.844 | 0.891 | 0.956 | 0.978 |
| Control | 3.52 | 3.84 | 3.82 | 0.87 | 0.78 |
| C1 | 2.93 | 3.60 | 3.93 | 3.22 | 3.13 |
| C2 | 3.69 | 4.80 | 5.25 | 6.79 | 5.76 |
| C3 | 3.83 | 4.27 | 4.96 | 6.60 | 5.60 |
| C4 | 4.19 | 4.76 | 5.59 | 7.49 | 6.53 |
| C5 | 3.81 | 4.37 | 5.34 | 6.73 | |
| C6 | 4.32 | 5.23 | 5.97 | 7.77 | 6.45 |
| C7 | 4.27 | 5.16 | 6.34 | 8.74 | 7.70 |

The invention claimed is:

1. A composition C, suitable as a foaming composition for enhanced oil recovery, which comprises, in an aqueous medium M:
 a surfactant or a mixture of surfactants capable of creating a foam in a presence of a gas; and
 a polymer P or a mixture of polymers P, wherein the polymer P is based on acrylamide or acrylamido units, and has an average molecular mass $M_w$ ranging from 1,000,000 to 20,000,000 g/mol;
 wherein
  the composition C has a viscosity, as measured at 25° C. under a shear rate of $10s^{-1}$, of is less than 6 mPa·s;
 wherein
 a total concentration of the polymer P or of the mixture of polymers P in the composition C ranges from 0.0025 to 0.1 wt % by mass relative to a total mass of the composition C and is greater than a concentration limit whereby an apparent viscosity of a foam obtained from the composition C is at least 10% greater than an apparent viscosity of a foam obtained from a composition C' at least under certain conditions, wherein the composition C' is a composition equal in all respects to the composition C, but deprived only of the polymer P or the mixture of polymers P; and
 wherein the composition C' has a viscosity, as measured at 25° C. under a shear rate of $10s^{-1}$, four times less than a viscosity of a composition C", wherein the composition C" is a composition equal in all respects to the composition C', but deprived of the surfactant or the mixture of surfactants.

2. The composition C according to claim 1, wherein a content of the polymer P or of the mixture of polymers P is selected in such a manner that an apparent viscosity of the foam obtained from the composition C in a sandpack test is at least 10% higher than an apparent viscosity of a foam obtained from the composition C' under same conditions, wherein the sandpack test is:
  carried out by co-injecting a composition to be tested with dinitrogen and with a gas fraction of 0.9, wherein the composition to be tested is the composition C or the composition C';
  using Ottawa sand with a permeability greater than 1 darcy, and
  with a back pressure of 50 bars at a temperature of 25° C. and at an interstitial speed of 100 ft/d.

3. The composition C according to claim 1, wherein the polymer P is at least one polymer chosen from:
  polyacrylamides, and copolymers comprising acrylamide units and acrylic acid units;
  polymers of 2-Acrylamido-2-MethylPropane Sulfonic acid (AMPS);
  copolymers comprising acrylamide monomer units and AMPS monomer units;
  polymers comprising acrylamide monomer units, AMPS monomer units and N-vinylpyrrolidone NVP units; and
  mixtures thereof.

4. The composition C according to claim 3, wherein the polyacrylamides are partially hydrolyzed.

5. The composition C according to claim 1, wherein a content of the surfactant or the mixture of surfactants is between 0.05% and 2% by mass relative to the total mass of the composition.

6. The composition C according to claim 1, comprising a mixture of surfactants containing:
  at least one anionic surfactant;
  at least one surfactant of zwitterionic or amphoteric type; and
  optionally at least one nonionic surfactant.

7. The composition C according to claim 6, wherein the at least one anionic surfactant is of sulfonate type.

8. The composition C according to claim 6, wherein the at least one surfactant of zwitterionic or amphoteric type is selected from the group of betaine or sultaine types.

9. The composition C according to claim 6, wherein the at least nonionic surfactant is of ethoxylated alcohol type.

10. A foam, comprising the composition C according to claim 1, wherein the foam has a gas fraction (fg) greater than or equal to 0.7.

11. A method of assisted oil recovery from an underground formation, comprising of:
  injecting the composition C according to claim 1 into the underground formation, via at least one injection well, wherein the composition C is in contact with a gas within the underground formation; then
  recovering, through at least one production well, a fluid conveying oil leaving the underground formation.

12. The method according to claim 11, wherein the composition C is selected in such a manner that when injected into the subterranean formation with the gas, with a gas fraction of 0.9, induces an apparent viscosity of at least 10% greater than an apparent viscosity induced by the composition C', under same conditions.

13. The method according to claim 12, wherein, the composition C induces an apparent viscosity of at least 10% greater than an apparent viscosity induced, under the same conditions, by the composition C'.

14. The method of claim 11, wherein the gas is selected from the group of water vapor, dinitrogen, $CO_2$, or hydrogen gas.

15. The method of claim 11, wherein injecting the composition C into the subterranean formation is selected from the group of: injecting the composition C as an expanded foam which contains the gas, injecting the composition C in a non-foamed form and the gas as a joint injection, injecting the composition C followed by injecting the gas, and injecting the composition C into the subterranean formation previously containing the gas.

* * * * *

UNITED STATES PATENT AND TRADEMARK OFFICE
CERTIFICATE OF CORRECTION

PATENT NO. : 11,814,579 B2  
APPLICATION NO. : 17/433163  
DATED : November 14, 2023  
INVENTOR(S) : Eloise Chevallier et al.

Page 1 of 1

It is certified that error appears in the above-identified patent and that said Letters Patent is hereby corrected as shown below:

In the Claims

At Column 10, Claim number 1, Line number 38, "of is less than" should read -- of less than --;

At Column 12, Claim number 13, Line number 26, "wherein, the" should read -- wherein the --;

At Column 12, Claim number 13, Line number 28, "the same" should read -- same --.

Signed and Sealed this  
Twenty-seventh Day of February, 2024

Katherine Kelly Vidal  
*Director of the United States Patent and Trademark Office*